(12) United States Patent
Andon

(10) Patent No.: US 10,282,773 B2
(45) Date of Patent: May 7, 2019

(54) THREE-DIMENSIONAL BODY SCANNING AND APPAREL RECOMMENDATION

(71) Applicant: Nike, Inc., Beaverton, OR (US)

(72) Inventor: Christopher Andon, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 68 days.

(21) Appl. No.: 15/727,819

(22) Filed: Oct. 9, 2017

(65) Prior Publication Data

US 2018/0033070 A1 Feb. 1, 2018

Related U.S. Application Data

(63) Continuation of application No. 15/169,264, filed on May 31, 2016, now Pat. No. 10,062,097.

(60) Provisional application No. 62/168,527, filed on May 29, 2015.

(51) Int. Cl.
*G06K 9/00* (2006.01)
*G06T 19/20* (2011.01)
*G06Q 30/06* (2012.01)

(52) U.S. Cl.
CPC ..... *G06Q 30/0631* (2013.01); *G06K 9/00201* (2013.01); *G06K 9/00362* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| 10,062,097 | B2 | 8/2018 | Andon et al. | |
|---|---|---|---|---|
| 2016/0048965 | A1* | 2/2016 | Stehle | G06T 7/0016 382/131 |
| 2016/0081435 | A1 | 3/2016 | Marks | |
| 2016/0350833 | A1 | 12/2016 | Andon | |
| 2017/0249783 | A1 | 8/2017 | Mach Shepherd et al. | |
| 2018/0047199 | A1 | 2/2018 | Andon | |

OTHER PUBLICATIONS

"U.S. Appl. No. 15/169,264, Corrected Notice of Allowance dated May 23, 2018", 8 pgs.
"U.S. Appl. No. 15/169,264, Notice of Allowance dated Apr. 24, 2018", 8 pgs.
"U.S. Appl. No. 15/169,264, Restriction Requirement dated Aug. 3, 2017", 7 pgs.
"U.S. Appl. No. 15/169,264, Examiner Interview Summary dated Jan. 22, 2018", 4 pgs.
"U.S. Appl. No. 15/169,264, Non Final Office Action dated Nov. 3, 2017", 14 pgs.
"U.S. Appl. No. 15/169,264, Response filed Feb. 2, 2018 to Non Final Office Action dated Nov. 3, 2017", 9 pgs.

* cited by examiner

*Primary Examiner* — Vu Nguyen

(74) *Attorney, Agent, or Firm* — Schwegman Lundberg & Woessner, P.A.

(57) ABSTRACT

Devices, systems, and methods include a three-dimensional (3D) scanning element, an electronic data storage configured to store a database including fields for 3D scan data and demographic information, a processor, and a user interface. In an example, the processor obtains 3D scan data of a body part of a subject from the 3D scanning element, analyzes the 3D scan data for incomplete regions, generate a composite 3D image of 3D scan data from the database based on similarities of demographic information, and overlays composite 3D image regions corresponding to incomplete regions on the 3D scan data.

18 Claims, 8 Drawing Sheets

THREE-DIMENSIONAL BODY SCANNING AND APPAREL RECOMMENDATION

PRIORITY

This application is a continuation application of, and claims the benefit of priority to, U.S. patent application Ser. No. 15/169,264, filed May 31, 2016 entitled, "THREE-DIMENSIONAL BODY SCANNING AND APPAREL RECOMMENDATION", which claims the benefit of priority to U.S. Provisional Patent Application No. 62/168,527, filed May 29, 2015, both of which are incorporated by reference herein in their entirety.

TECHNICAL FIELD

The subject matter disclosed herein generally relates to three-dimensional scanning of body parts and recommendations for apparel for that body part.

BACKGROUND

Three-dimensional ("3D") scanning of human and animal body parts has been utilized to provide high resolution scans of such body parts. Technologies such as laser scanning and visual imaging can, in controlled settings, produce 3D scans with millimeter accuracy or better. Such precise scans allow for the precise fitting of various articles and devices, including medical and medical-grade devices among other items.

BRIEF DESCRIPTION OF THE DRAWINGS

Some embodiments are illustrated by way of example and not limitation in the figures of the accompanying drawings.

DETAILED DESCRIPTION

Figure 1:
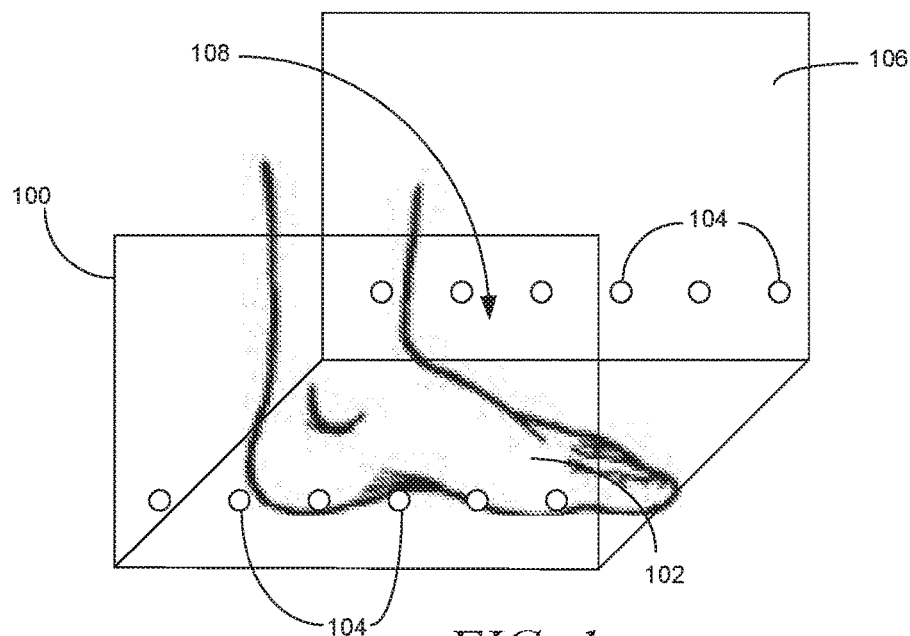
FIG. 1 is a depiction of a 3D scanner in relation to a human foot, in an example embodiment.

Example methods and systems are directed to three-dimensional scanning of body parts and recommendations for apparel for that body part. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Precision scanning in controlled environments can be comparatively onerous, both for the subject of the scan and technicians conducting the scan. Because of the need for precision, the subject of the scan may have to remain immobile in a scanner for tens of seconds or more. In a physician's office, for instance, such may not be perceived as a burden. However, in a commercial or casual setting, the subject of the scan may be made uncomfortable, impatient, or otherwise have the quality of their experience reduced by having to undergo medical-like experiences in order to obtain the benefits of precision 3D scanning.

In various cases, 3D scanning may be provided that is faster and less-intrusive than medical-grade scanning, generally at the expense of accuracy and, in various cases, user experience. However, relatively precise 3D scanning may be advantageous in order to produce desired product recommendations or custom products for customers. For instance, the tolerances on footwear, such as a pair of shoes, may benefit from medical-grade accuracy but, as noted above, requiring users to undergo medical-grade 3D scanning to obtain such results may lessen the customer experience and potentially drive away customers.

A 3D scanning system has been developed that may allow for rapid 3D scanning with relatively high precision, notwithstanding gaps in the data that may arise from the speed of the scan. High-precision scans of a portion of a body part may be obtained quickly, allowing for the fact that the scan may be incomplete. Missing data from the scan is then interpolated based on demographic data of the subject. A database includes foot scans of a range of subjects along with accompanying demographic data of the subjects. By inputting demographic information of the subject of the instant scan, a system obtains complete scan information of demographically related individuals and utilizes that data to infer the nature of any gaps in the instant scan. By so doing, attempts to fill in the gaps in the instant scan may be made not on the basis of straight, mathematical interpolation of the instant scan but by considering the physical characteristics of other, demographically similar people.

Further, while a precise scan may allow for inferences to be made regarding what size of apparel or other objects may fit the scanned body part, such analyses may relate in general only to identifying interference or collisions between the object and the scanned body part. However, objects such as apparel in particular are not rigid but are conventionally flexible and often desirably conformal with vary degrees of tightness in various locations on the body part. Thus, simply identifying points of interference or collisions between, for instance, a shoe and a foot as scanned may not give desired information regarding fit and likely comfort.

The 3D scanning system thus provides not merely points of interference or collision between an object and a body part but also a degree of fit or tightness that may be expected to result over the scanned area if a given object is worn on the body part. As a result, judgments may be made as to whether or not a desired fit or snugness may be obtained with the object. The 3D scanning system may present the fit information as a heat map or other visual representation of the degree of interference between the object and the scanned body part.

Furthermore, while 3D scans are taken at discrete times or discrete time periods, the characteristics of a body part may tend to change naturally over time even if the person is not necessarily growing or changing in substantial ways. For instance, the shape of a person's foot may undergo significant changes, often temporary, depending on the activities the person is engaged in. A person who trains for and runs a marathon may have a meaningfully different foot shape at the start of their training compared with at the end of their training. A runner who changes from a highly structured shoe to a minimally structured shoe may utilize different muscles, resulting in the development or atrophy of various muscle groups over time. Furthermore, the wear on the runner's shoes may be of interest in determining what new shoes may be advantageous for the runner in the future The 3D scanning system may integrate multiple scans over an extended period of time, e.g., days, weeks, months, or years, of one or both of the body part and the object that is worn on the body part and interface with external information about the subject of the scan to identify activity patterns engaged in by the subject. Based on those activity patterns, the scanning system may make assessments of the effectiveness of the previous recommendation and/or adjustments to future recommendations for fittings.

FIG. 1 is a depiction of a 3D scanner 100 in relation to a human foot 102, in an example embodiment. The 3D scanner 100 includes scanning elements 104 positioned on a chassis 106 to obtain a scan of any object in the scanning volume 108. The scanning elements 104 may be any of a variety of scanning elements known in the art, including but not limited to visible light cameras, laser sensors, sonar sensors, and the like. The scanning elements 104 are arrayed to obtain a wide range of coverage of the foot 102. In various examples, the scanning elements 104 are arrayed to fully cover the foot 102 but gaps in the coverage of the foot 102 may be compensated for as disclosed herein.

While the scanner 100 is described with respect to a foot 102, it is to be understood that the scanner 100 may be sized to admit both of a subject's feet into the scanning volume 108. In such an example, a single scan may produce scans of both feet at once. Further, while the scanner 100 is described with respect to a foot 102 specifically, it is to be understood that the principles described are applicable to any body part or any other object.

The scanner 100 may obtain a scan of the foot 102 based on the foot 102 remaining in the scanning volume 108 for a predetermined time. The scan may be relatively more complete and accurate the longer the foot 102 is in the scanning volume 108. As such, if the foot 102 passes through the scanning volume 108 relatively quickly, e.g., on the order of one (1) second or less, or if the scanner 100 is deliberately set for a relatively fast scan time, then the resultant scan of the foot 102 may be incomplete or otherwise inaccurate.

Further, the accuracy of the scan may be reduced unless the foot 102 is bare or otherwise unencumbered with other objects. In certain circumstances, however, a subject may be uncomfortable or otherwise unwilling or unable to have their foot 102 be unencumbered. In such an example, portions of the foot 102 that are obscured may not be accurately scanned.

Figure 2:
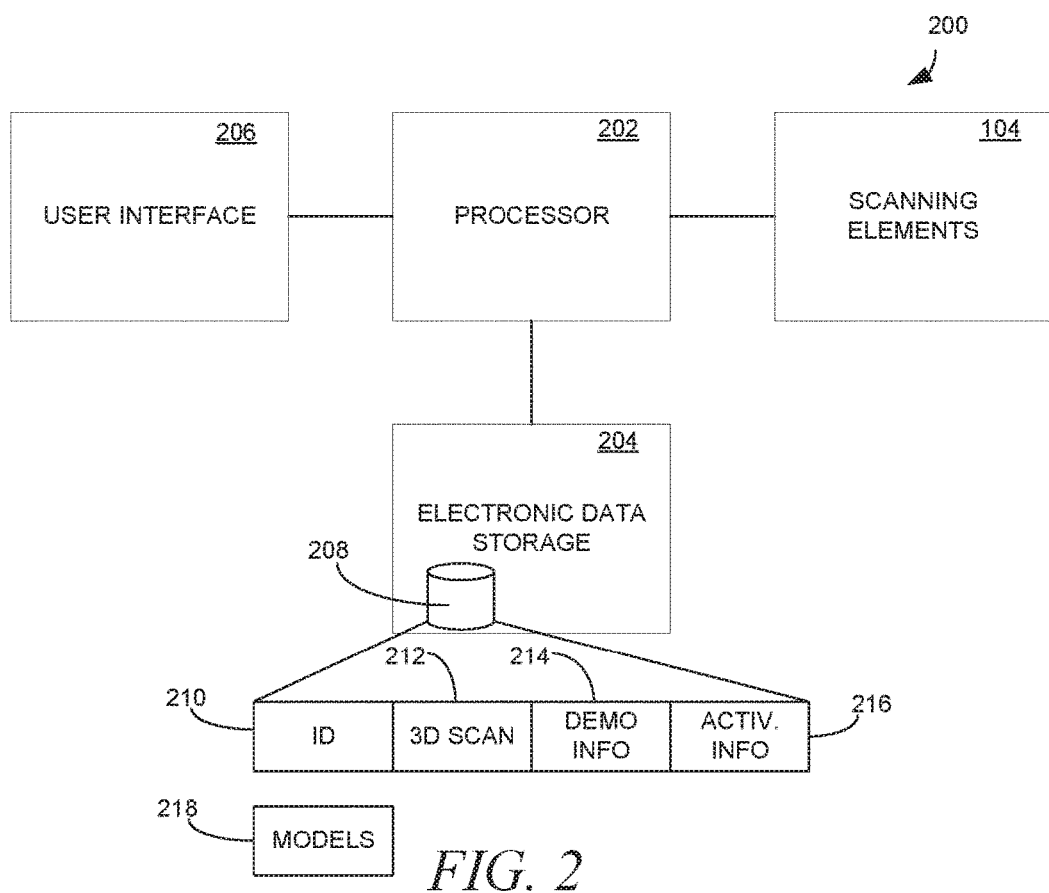
FIG. 2 is a block system diagram of electronics of a scanner and/or a system related to the scanner, in an example embodiment.

FIG. 2 is a block system diagram 200 of electronics of the scanner 100 and/or a system related to or including the scanner, in an example embodiment. A processor 202 is coupled to the scanning elements 104. The processor 202 receives a scanning element output from each of the scanning elements 104 and processes the output to generate a 3D rendering of the foot 102 according to methodologies known in the art.

The processor 202 is further coupled to an electronic data storage 204 and a user interface 206. The electronic data storage 204 may be local or remote data storage as well known in the art. The electronic data storage 204 provides storage for, among other data, a database 208. The database 208 includes data fields for: a unique subject identifier 210; data related to a 3D scan 212 of the subject's foot 102; demographic information 214 of the subject; and activity information 216 of the subject. The demographic information 214 optionally includes fields for age, sex, height, weight, race, and any other information about 3D scan subjects that may be of interest for the purposes disclosed herein. The demographic information 214 and or the database 208 generally may further include subjective information about the subject and the subject's foot 102 that may be input by a user, such as the subject, via a user interface, as disclosed herein. The activity information 216 may include information related to activities, such as physical activities that have been performed by the subject, such as a category of the activity (e.g., running, cycling, swimming, etc.), a time and duration of the activity, an amount of activity (e.g., a distance run/cycled/swum, etc.), and equipment used in the activities, including characteristics of the equipment and changes in the equipment over time as the equipment has been used, among other activity information as desired and as appropriate.

The user interface 206 is configured to display the 3D scan as obtained and/or information related to the 3D scan or recommendations based thereon. The user interface 206 includes a visual display and, optionally, a user input device, such as a keyboard, touchscreen, and the like. While the components of the block system diagram 200 are shown coupled together directly, e.g., as part of a single, unitary device, it is emphasized that any or all of the components may be remote, distributed, redundant, and the like to allow for a flexible and accessible system. Thus, in an example, the processor 202, the electronic data storage 204, and the user interface 206 are components of a user device, such as a mobile device, e.g., a smartphone or tablet computer, or a personal computer, such as a laptop computer, desktop computer, or workstation, among any of a variety of additional implementations.

The 3D models of articles of footwear may be stored in the database 208 and/or in the electronic data storage 204 generally as footwear models 218 or may be obtained from any other suitable source. The 3D models may incorporate not just a shape of an associated article of footwear but physical properties of the article of footwear, including an elasticity or general flexibility of the materials that make up the article of footwear.

Figure 3:
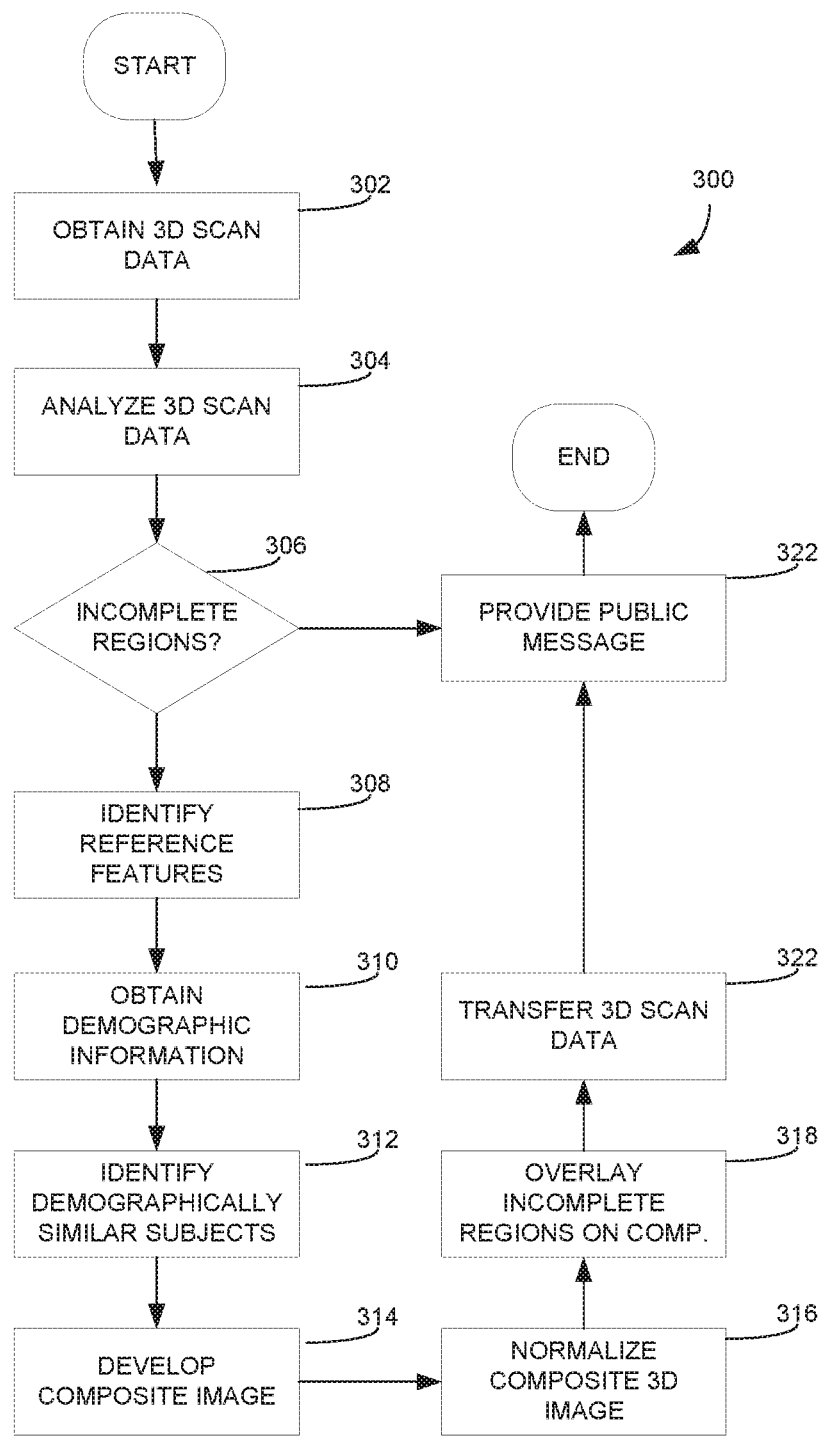
FIG. 3 is a flowchart for using demographic data to interpolate portions of a foot from the 3D scan, in an example embodiment.

FIG. 3 is a flowchart 300 for using demographic data 214 to interpolate portions of the foot 102 from the 3D scan, in an example embodiment. The interpolation may be based on portions of the 3D scan that accurately depict the foot in order to infer a geometry or contour of the foot 102 in portions of the 3D scan that are not obtained or that include data that is not likely to be a valid or otherwise accurate 3D rendering of the foot 102.

At 302, the scanner 100 obtains 3D scan data of the foot 102 using the scanning elements 104 and optionally stores the data as 3D scan data 212 in the database 208.

At 304, the processor 202 analyzes the 3D scan data, either as accessed from the database 208 or directly from the scanning elements 104, to identify aspects of the 3D data that are missing or are suspected of being an inaccurate depiction of foot 102. The processor 202 may identify inaccurate or missing regions based on conventional image recognition methods known in the art, including by identifying regions of the 3D scan that lack a threshold level of definition or clarity, that show surfaces that are flatter than a predetermined threshold level, or that otherwise are not or cannot be identified as being part of a human foot 102.

Additionally or alternatively, the analysis of the 3D scan data may be performed by a human operator. In such an example, the processor 202 causes the 3D scan data 212 to be rendered on the user interface 206 for review by the operator. The operator may then utilize a user input device to mark regions of the scan that are missing or inaccurate. For instance, the operator may utilize a mouse, touchscreen, or other graphic input device to draw a boundary around regions that appear to be missing or inaccurate in order to designate those regions for interpolation in subsequent operations of the flowchart 300.

At 306, the processor 202 determines if inaccurate or incomplete regions of the 3D scan 212 have been identified. If so, the processor proceeds to 308 to interpolate characteristics of the missing data based on demographic information 214. If not, the processor proceeds to 322 to display the 3D scan on the user interface.

At 308, the processor 202 utilizes conventional image recognition mechanisms to identify one or more reference features on the 3D scan data of the foot 102. The reference features may be any plainly identifiable feature conventionally associated with a foot 102, including toes/toe nails, the heel, an ankle (which is not conventionally included as part of the foot 102 but which may have been included in the 3D scan), an arch, and the like. It is noted that if the 3D scan data 212 is so incomplete that it is impossible to recognize sufficient reference features then the flowchart 300 may terminate and variously display the 3D scan without interpolation or provide a message that the 3D scan cannot be used, among other possible outcomes.

At 310, the processor 202 obtains demographic information of the subject of the 3D scan. The operator may enter at least a unique subject identifier of the subject via the user interface 206. If the subject already has corresponding demographic information 214 in the database 208 then the processor 202 may access that information 214. The operator or subject may additionally or alternatively enter demographic information, either new or updated, via the user interface 206. The processor 202 may optionally store the demographic information as entered in the database 208.

At 312, the processor 202 identifies demographically similar subjects to the subject of the 3D scan that already have 3D scan data 212 in the database 208. Demographic similarity may be based on any demographic category stored in the demographic information 214 and as detailed herein. In an example, demographic similarity is determined based on a number of categories of a stored subject that are within a bound of those of the instant subject. Thus, for instance, if the instant subject is thirty-three years old then stored subjects may be demographically similar in the age category if they are between the ages of thirty-one and thirty-five, inclusive. The instant and stored subjects may be demographically similar based on sex by having the same sex. The instant and stored subjects may be demographically similar based on height by having the same height plus-or-minus one inch, and so forth.

It is noted and emphasized that the precise process by which demographic similarity is determined may be dependent on a variety of factors, including the size of the population of stored subjects in the database 208. Thus, if the population of stored subjects is very large then demographic similarity may be based on very tight tolerances while, if the population of stored subjects is small then demographic similarity may be relatively loose. In an example, the processor 202 may adjust the tolerances on identifying demographic similarity in order to produce a population of one hundred (100) of the most demographically similar stored subjects among the subjects stored in the database 208. The number of demographically similar stored subjects identified may be varied based on the size of the population of stored subjects and the computing resources of the processor 202.

At 314, the processor 202 develops a composite 3D image among the demographically similar stored subjects by accessing the 3D scans 212 of those stored subjects and averaging their 3D scans or otherwise applying operations that are utilized in the art to generate composites of multiple individual items.

At 316, the processor 202 normalizes the size of the composite 3D image to the size of the 3D scan of the instant subject based on the reference features of the composite 3D image in relation to the instant 3D scan. In other words, if the instant 3D scan is 10.5 inches from toe-to-heel and 4.25 inches at the widest point (among other measurable features) then the composite 3D image is normalized to have the same measurements.

At 318, the processor 202 overlays the regions that have been identified as being incomplete or inaccurate from the instant 3D scan onto the composite 3D scan.

At 320, the processor 202 transfers the 3D scan data corresponding to the overlaid regions from the composite 3D scan to the instant 3D scan data.

At 322, the processor 202 causes the instant 3D scan to be displayed on the user interface and/or stored as 3D scan data 212 in the database 208. The instant 3D scan as displayed reflects the updated or interpolated 3D scan data from the composite 3D scan if the original instant 3D scan data included incomplete or inaccurate regions. If the instant 3D scan did not include incomplete or inaccurate regions then the instant 3D scan is simply displayed and/or stored as originally obtained by the scanning elements 104. The operations from 302 to 322 may be repeated to cause display of the 3D scan as an animation.

Figure 4:
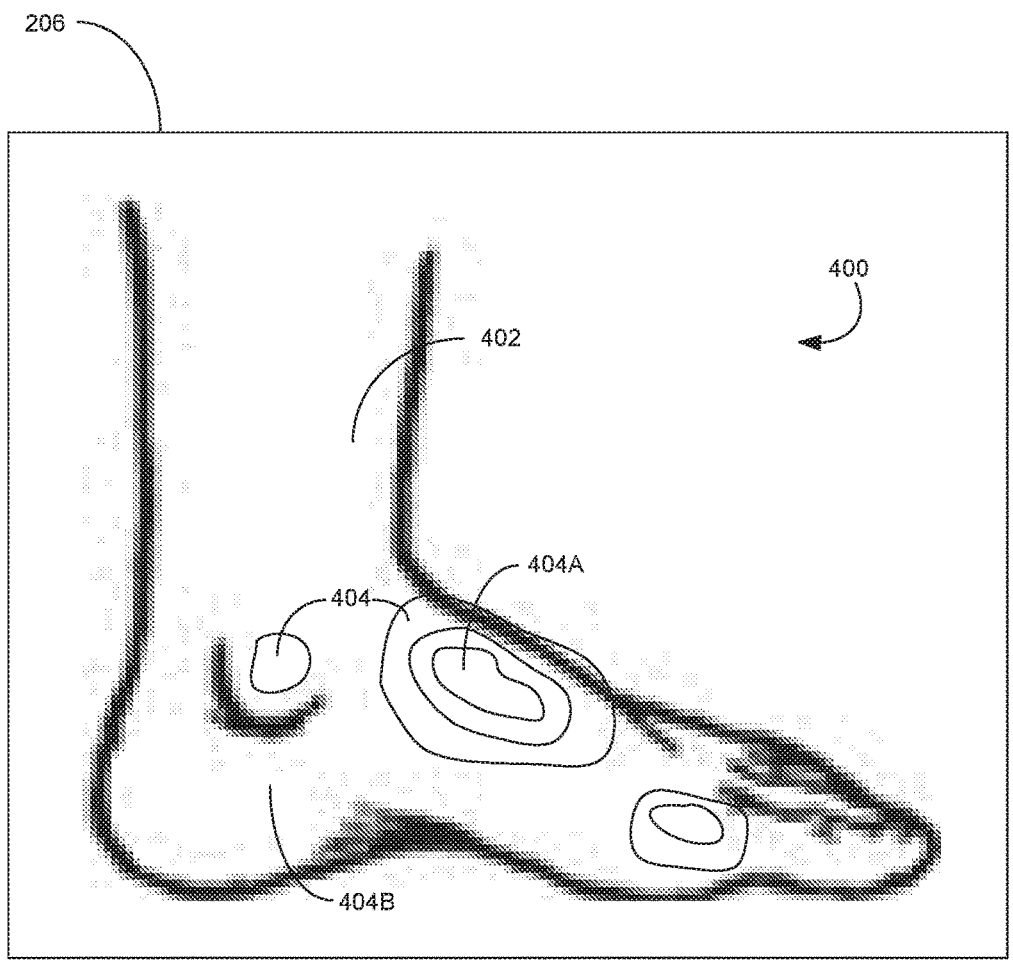
FIG. 4 is a heat diagram of a 3D scan of a foot as displayed on a user interface, in an example embodiment.

FIG. 4 is a heat diagram 400 of a 3D scan 402 of a foot 102 as displayed on the user interface 206, in an example embodiment. The 3D scan 402 of the foot 102 may be obtained according to the flowchart 300 but it is noted and emphasized that any complete or otherwise accurate 3D scan 402 of the foot 102 may be obtained and utilized. The heat diagram 400 presents the 3D scan 402 of the foot 102 in relation to 3D models of articles of footwear.

As illustrated, the heat diagram 400 provides heat zones 404, isobars, or other graphical representations of a degree of interaction between the 3D scan 402 and the model of the article of footwear. Specifically, in the illustrated example, the heat zones 404 are indicative of a degree of tightness of the materials of the article of footwear in relation to the foot 102. Thus, heat zones 404 range from tight zones 404A to loose zones 404B and gradations between. The heat zones 404 may represent absolute degrees of tightness of the article of footwear in the given regions of the foot 102 based, in an example, on a degree of deformation of the article of apparel in relation to the elasticity of the local material. Thus, if, to fit the foot 102, a substantially inelastic portion of the article of footwear had to deform relatively significantly to fit the foot 102 then that region may correspond to a tight zone 404A, while a region of the article of footwear that didn't have to deform at all to fit the foot 102 would correspond to a loose zone 404B. A region where a relatively elastic portion of the article of footwear would deform moderately to fit the foot 102 may correspond to a moderate zone 404 between the tight zones 404A and loose zones 404B.

It is noted that, in the illustrated example, the article of footwear is not depicted in relation to the 3D scan 402. In the illustrated example, the appearance of the article of footwear itself is superfluous in relation to how the article of footwear may be expected to fit on the foot 102. However, various implementations of the heat map 400 may include a depiction of the article of footwear overlaying the 3D scan 402.

On the basis of the heat map, an operator or the subject of the 3D scan may observe the heat diagram 400 and see how a given article of footwear may be expected to fit on the subject's foot 102. The processor 202 may sequentially or iteratively apply different sizes, makes, and models of articles of footwear to the 3D scan 402 in order to display how those sizes, makes, and models of footwear will tend to fit on the foot 102.

In various examples, on the basis of the heat diagrams 400 that are generated by the processor 202 from applying various sizes, makes, and models of articles of footwear to the 3D scan 402, the processor 202 may identify certain sizes, makes, and models that may be recommended for the foot 102. The tightest zones 404A may be deemed to be undesirable while too many loose zones 404B may likewise be undesirable. Thus, in an example, the processor 202 may decline to recommend any article of footwear that has a tight zone 404A and any article of footwear that has more than twenty-five percent loose zones 404B. The processor 202 may, based on feedback form multiple subjects, identify a overall tightness characteristic that tends to be preferred by subjects of the 3D scan. However, it is emphasized that the desirability of tightness in an article of footwear may be highly subjective based on the wearer's preferences and general, objective criteria for recommended fit may be impossible or not applicable to all wearers.

Figure 5:
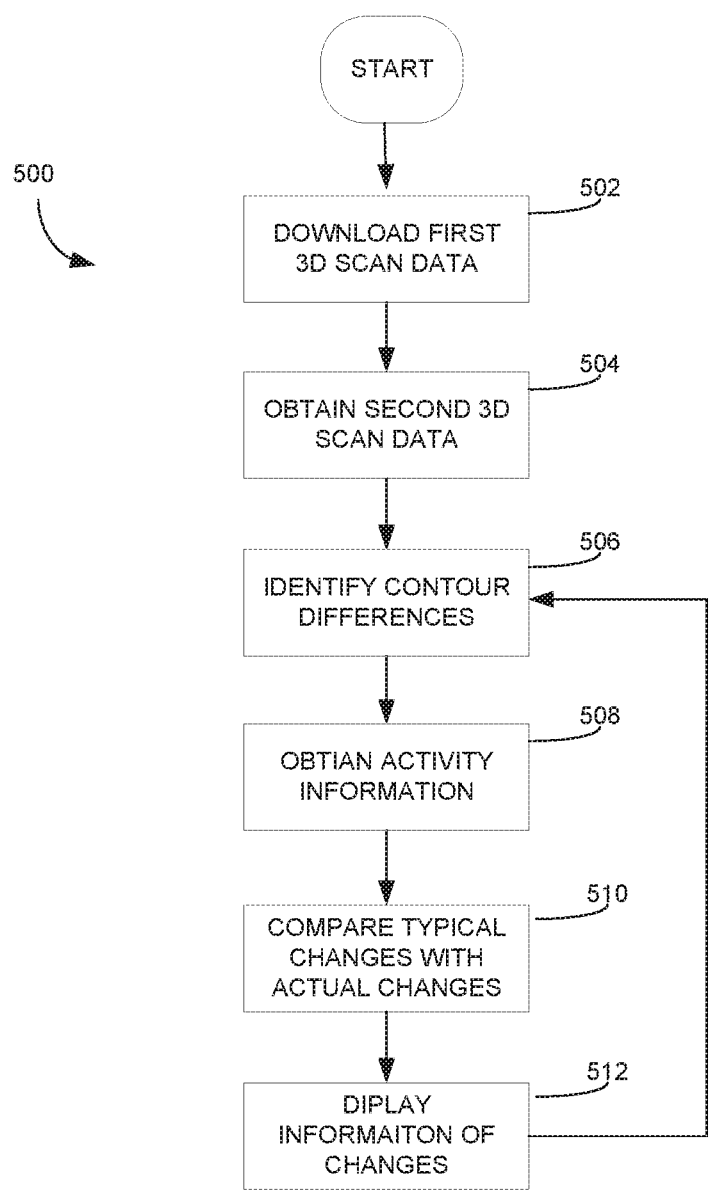
FIG. 5 is a flowchart for evaluating changing characteristics of a foot or article of footwear over time, in an example embodiment.

FIG. 5 is a flowchart 500 for evaluating changing characteristics of a foot 102 or article of footwear over time, in an example embodiment. While the flowchart 500 is described with respect to the 3D scanner 100 and the system 200 generally, it is to be recognized and understood that the flowchart 500 may be implemented on or with respect to any suitable 3D scanner or system. Further, as is the case throughout this document, while the flowchart 500 is described specifically with respect to the foot 102 and to an article of footwear, it is to be understood that the principles disclosed herein are applicable to a body part in general and to an article of apparel.

At 502, the processor 202 downloads from the database 208 first 3D scan data of one or both of a foot 102 and an article of footwear from a first time earlier than a time of the downloading of the 3D scan data.

At 504, the processor 202 obtains second 3D scan data from the one or both of the foot 102 and the article of footwear. In an example, the processor 202 obtains the second 3D scan data directly from the 3D scanner 100 and the scanning elements 104. Alternatively, the processor 202 accesses or downloads the second 3D scan data 212 from the database 208. In such an example, the second 3D scan data 212 obtained from the database 208 at 504 is at a second time later than the first time from which the first 3D scan data 212 obtained from the database 208 was generated.

At 506, the processor 202 identifies differences in the contours between the first 3D scan data and the second 3D scan data. In the case of the foot 102, the differences in the 3D scan data may reflect a physiological change in the foot 102 and features of the foot 102, such as swelling or flattening of an arch, the development or atrophy of muscles, among any of a variety of detectable physiological changes in the foot 102. In the case of the article of footwear, the differences in the 3D scan data may reflect wear or structural deterioration of the article of footwear. In various examples, the wear may be reflected in deterioration of a tread on an outsole, among other forms of wear, while structural deterioration may be reflected in a sag or other distortion in the structure of the article of footwear when the article of footwear is sitting without an external force being applied to the article of footwear.

At 508, the processor 202 obtains activity information 216 of the person to whom the foot 102 and/or article of footwear corresponds. The activity data 216 may be obtained from a fitness tracker associated with the person, from input into the user interface 206, or any other suitable source of activity information.

The activity information may cover both the nature of the activities themselves as well as equipment and apparel utilized in the activities. Thus, the activity information may specify both that the subject ran various distances at various times as well as the shoes that the subject wore while doing so. If, for instance, the activity information reflects that the subject changed footwear at some point, for instance by transitioning from a shoe that is structured so as to provide significant support to the foot to a shoe that is structured to provide little support to the foot, the activity information may inform the interpretation of any physiological change in the musculature of the foot 102 that may result from using or not using various muscle groups.

At 510, the processor 202 compares typical physiological changes in the foot 102 from identified activities or typical wearing on an article of footwear from an amount of use with actual physiological changes and/or actual wear on the article of footwear to identify changes from the first time to the second time that are aberrant in comparison with typical or expected changes. By way of example, while foot 102 swelling may be expected of approximately five percent while a runner is training for a marathon, swelling of ten percent may be indicative of a need for better support in running footwear that is being worn by the runner. By way of further example, if the wear on the outsole of a shoe is not even but rather concentrated in certain locations the runner may be experiencing collapsing arches, indicating a need for greater arch support in the runner's footwear.

At 512, the user interface 206 displays information indicative of the changes in the foot 102 and/or article of footwear and, optionally, an assessment or recommendation in view of the changes in the foot 102 and/or article of footwear. The recommendation may be in regards to the purchase or acquisition of a new article of footwear or other piece of equipment or a recommendation for a change in activity patterns, as appropriate. The information indicative of the changes in the foot 102 and/or article of footwear may be in percentage terms, graphical representations, or any suitable representation of the change.

In various examples, if activity information reflects that the subject has changed equipment over time, the assessment may reflect how the subject may have been expected to react to the change in equipment. Thus, in the above example of switching from a high-structure shoe to a low-structure shoe, the musculature of the foot 102 may be expected to change in certain ways as the subject acclimates to the new lack of support from the shoe. The assessment may reflect the degree to which the subject has or has not adapted to the change in shoe and may provide the basis for a recommendation to change a running style (e.g., land on a forefoot rather than a heel), a change in a running amount (e.g., reduce running distance by 50% for one month), or a change in shoes (e.g., return to a high-structure model).

Upon displaying the information indicative of changes, the flowchart 500 may wait for a third 3D scan at a third time in the future to be obtained. Upon obtaining the third 3D scan, the flowchart may return to 506 to identify differences in the contours from the first and second 3D scans to the third 3D scan and continue through the flowchart 500 based on having three sets of 3D scans. The flowchart 500 may continue iteratively or sequentially with additional 3D scans at different times, with the additional 3D scans being utilized as additional data points or data sets to identify changes in the foot 102 and/or article of footwear. The activity information 216 would be further updated and new recommendations generated based on the differences in the changes relative to expected changes over the period of time.

FIGS. 6A-6D are depictions of a user interface screen 600 of the user interface 206, in an example embodiment. As disclosed herein, the user interface screen 600 may be utilized to output information regarding 3D scans of the foot 102 as well as recommendations for footwear based thereon. Additionally or alternatively, the user interface screen 600 may be utilized to facilitate obtaining subjective information about the foot 102 from a user of the user interface screen 600. Such subjective information may be utilized in addition to the 3D scan information or instead of the 3D scan information as a virtual 3D scan according to the principles disclosed herein.

In an example, the user interface screen 600 displays a virtual foot 602 at various times. The difference between the first time and the second time may be relatively short (seconds or fractions of a second), as in animation of the virtual foot 602, or relatively long (hours, days, weeks, or more) to show physiologic changes in the virtual foot 602. The user interface screen 600 further discloses a prompt field 604 on which questions and/or directions may be displayed and a response field 606 in which a user may input data in response to the prompt. The virtual foot 602 itself may function as a visual response field, as disclosed herein. In various examples, the virtual foot 602 may be a generic image of a foot selected from the models 218 based on the demographic data 214, if available, or without respect to any other data. Alternatively, the virtual foot 602 may be based on the 3D scan obtained as disclosed herein. The iterative changing of the virtual foot 602 may serve, in various instances, to refine the interpolation of the missing elements of the foot 102 or may operate instead of interpolating missing elements. As such, the operations disclosed herein may be conducted either as a refinement of the previously obtained 3D model or as a way of obtaining subjective information from the user of the user interface 206 without regard to or without need for a 3D scan of the foot 102.

In various examples, the processor 202 causes the user interface screen 600 to prompt the user iteratively to identify differences between the foot 102 and the virtual foot 602, update the virtual foot 602 as displayed, and then prompt the user for further differences between the foot 102 and virtual foot 602 until the virtual foot 602 approximates the foot 102 based on the subjective opinion of the user. While the disclosure herein refers to the foot 102 as being of the user, it is to be understood that the user of the user device 206 may be someone acting on behalf of the foot 102 that is the subject of the scan. For the purposes of simplicity, however, this will be referred herein to simply the user and the foot 102 of the user without limitation on the ability of the user to perform the same actions on the behalf of another person.

The processor 202 may further prompt the user to input information about current or past articles of footwear the user has worn and how the article of footwear feels or has felt. Such information about past articles of footwear may be utilized for a baseline virtual foot 602 and/or to provide recommendation for articles of footwear following user inputting the subjective information.

Figures 6A, 6B:
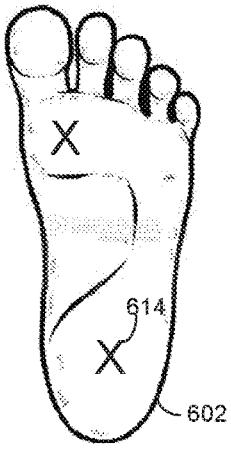
FIGS. 6A-6D are depictions of a user interface screen of the user interface, in an example embodiment.

FIG. 6A illustrates the user interface screen 600 prompting the user for current or past articles of footwear the user has worn. In the illustrated example, the prompt field 604 prompts the user to enter the brand, model, and size of a current or recently worn article of footwear, in the illustrated example a running shoe. The response field 606 includes dropdown menus 608 corresponding to brand, model, and size of running shoes included in the models 218. The user may select such characteristics using the dropdown menus 608 if the information is known or may select a pick box 610 indicating that the user does not have current or recent running shoes or the running shoes the user currently has are not included in the dropdown menus 608. The prompt and responses are not exhaustive, and it is emphasized that additional information may be obtained, e.g., general satisfaction of the user with their current or recent running shoe, running style (heel strike, forefoot strike, midfoot strike, etc.) and so forth. Further, information, such as foot size, may be entered without respect to a currently or recently worn shoe. Upon entering the relevant information as appropriate in the response field 606, the user may select the ENTER button 612 to proceed to the user interface screen 600 as depicted in FIG. 6B.

Figure 6C:
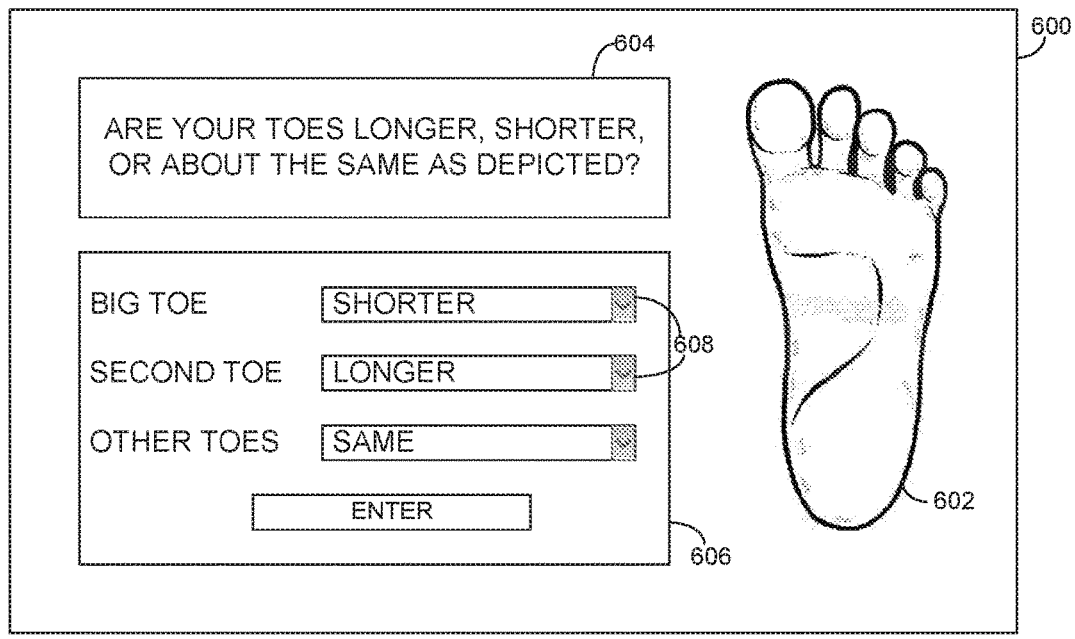

FIG. 6B illustrates the user interface screen 600 prompting the user to enter points of discomfort 614 on the virtual foot 602 caused by their current or recent running shoe. In such a case, the user interface 206 may include a touchscreen to allow the user to select locations on the virtual foot 602 or may include a cursor (not pictured) controlled by a mouse, trackball, touchpad, or other input mechanism. It is noted that, while the virtual foot 602 as depicted is the bottom of the foot, a top-down image of the virtual foot 602 may be displayed in addition or instead of the bottom image. Points of discomfort may correspond to heat zones as disclosed herein, points of snugness or looseness, or any aspect of the article of footwear that does not feel right to the user. Upon entering either the points of discomfort 614 or indicating that none exist or points of discomfort are not applicable then the user may select the ENTER button 612 to proceed to the user interface screen 600 as depicted in FIG. 6C. It is noted that, if the user indicates that the user does not have current or recent running shoes in the preceding screen that the user interface screen 600 of FIG. 6B may be skipped or omitted.

FIG. 6C illustrates the user interface screen 600 prompting the user to subjectively and iteratively indicate the general characteristics of their own foot by changing the appearance of the virtual foot 602. The prompt field 604 variously prompts the user to indicate that parts of the virtual foot 602 should change or stay the same. Such parts may include, without limitation, the user's relative toe length (as illustrated), foot width at various points, arches, and heel, among any of a variety of characteristics of the anatomy of the foot. Using the response field 606, the user may indicate that the prompted parts should change in various ways or stay the same. In the case of the toes as illustrated, the big toe, second toe, and other toes may variously be made longer, shorter, or stay the same using the dropdown menus 608.

If the user inputs "SAME" for all dropdown menus 608 and selects ENTER it is understood that the user considers the prompted parts of their foot to correspond to the virtual foot 602 as currently shown. In that case, the user interface screen 600 may be displayed again with a prompt for a different part of the foot or, if all parts of the foot for which information may be obtained have been prompted and answered, the user interface screen 600 may be displayed as in FIG. 6D. If not, the appearance of the virtual foot 602 is updated based on the responses and redisplayed. For instance, if the user has entered responses as illustrated in FIG. 6C, the virtual foot 602 in a subsequent rendering may depict the big toe, e.g., five percent shorter, the second toe five percent longer, and the other toes in their previously presented configuration. The user may iteratively update the appearance of the toes until the user believes the toes of the virtual foot 602 approximately correspond to the user's toes, and then iteratively update the additional features of the virtual foot 602 until user believes the virtual foot 602, or various aspects thereof, approximately corresponds to the associated aspects of the user's own foot.

Additionally or alternatively, in various examples, the user may "drag-and-drop" aspects of the virtual foot 602 to change the appearance of the virtual foot 602 to conform to the user's own foot. Thus, for instance, the user may select and shorten the big toe, select and lengthen the second toe, widen the foot, and so forth, and then select ENTER when satisfied that the virtual foot 602 corresponds to the user's own foot. In such a case, iterative updating of the foot described above may be dispensed with or provided as an additional mechanism to adjust the appearance of the virtual foot 602.

Figure 6D:
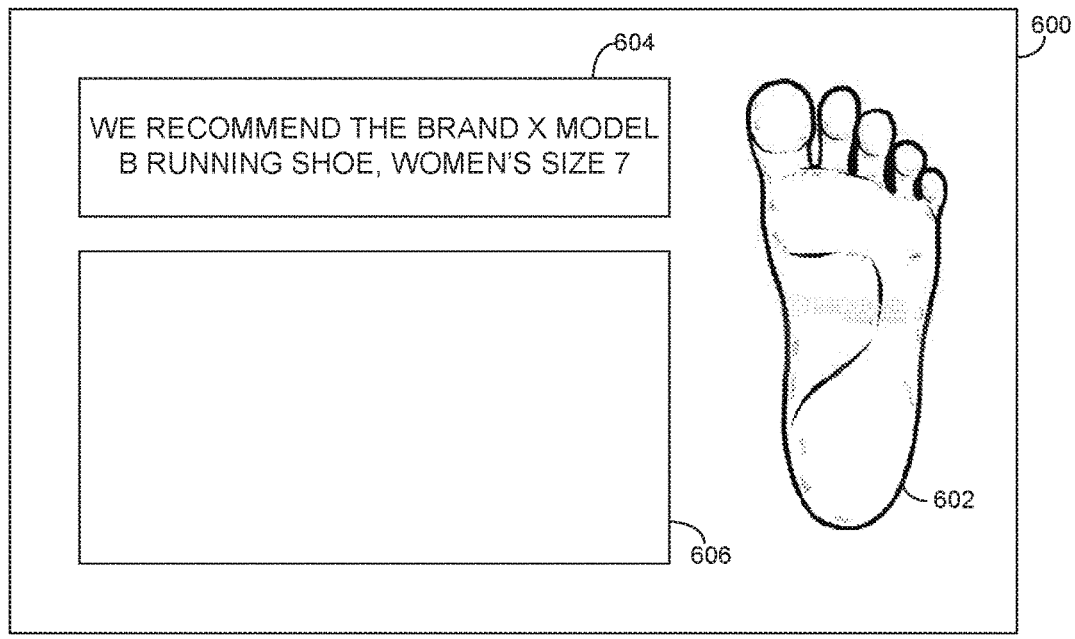

FIG. 6D illustrates the user interface screen 600 providing a recommendation for a running shoe based on the user input as described herein. The recommendation may be based on the input provided via the user interface screen 600 as well as the 3D scan as obtained, in various examples. The recommendation is displayed in the prompt field 604 and indicates at least one recommendation for a running shoe, including a brand, a model, and a size. It is noted that for purposes of example illustration, the user in FIG. 6A indicated having worn brand X, model A, size 6.5, while the recommendation is for brand X, model B, size 7. Thus, in such an example, the process may have determined that a larger size of a different model shoe would be a better fit for the user based on the responses as entered and by a relationship of the model 218 corresponding to the model A shoe in relation to the model 218 corresponding to the model B shoe.

Figure 7:
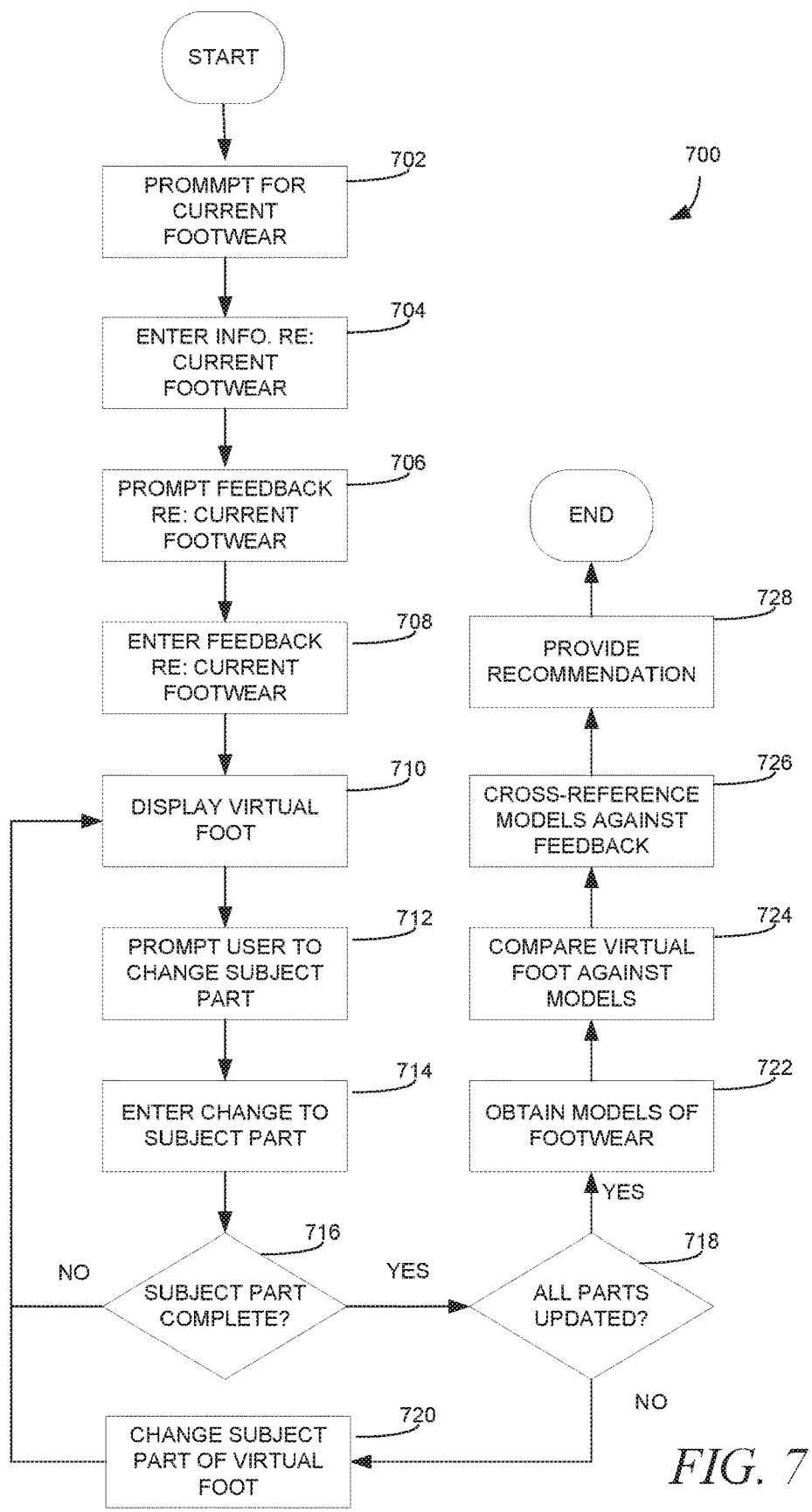
FIG. 7 is a flowchart 700 for iteratively updating a virtual foot based on user responses, in an example embodiment.

It is noted that where objective information about the foot of the user is not available, FIG. 7 is a flowchart 700 for iteratively updating a virtual foot 602 based on user responses, in an example embodiment. The flowchart 700 is based on use of aspects of the system 200 and prompts and responses on the user interface screen 600. However, it is to be recognized and understood that any suitable system and/or user interface screen may be utilized. Further, while various operations are presented as part of the flowchart 700, it is to be understood that various operations are optional and may be omitted as appropriate to various implementation conditions and/or circumstances.

At 702, the processor 202 causes the user interface screen 600 to prompt the user via the prompt field 604 for information about a currently or recently worn article of footwear, as illustrated in FIG. 6A.

At 704, the user enters information about one or more currently or recently worn articles of footwear via the response field 606.

At 706, the processor 202 causes the user interface screen 600 to prompt the user via the prompt field 604 for feedback regarding a current or recently worn article of footwear, as illustrated in FIG. 6B.

At 708, the user enters information about areas of discomfort from the current or recently worn article of footwear, including indicating points of discomfort 614 on the virtual foot 602 induced by the current or recently worn article of footwear.

At 710, the processor 202 causes the user interface screen 600 to display the virtual foot 602 as iteratively updated herein. In a first instance, the virtual foot 602 may be a generic foot. Additionally or alternatively, the processor 202 may obtain or provide a 3D model of the user's foot 102 as disclosed herein. Subsequent displays of the virtual foot 602 may be as iteratively updated, as illustrated in FIG. 6C.

At 712, the processor 202 causes the user interface screen 600 to prompt the user to change one or more subject parts of the virtual foot 602 to improve a similarity between the virtual foot 602 and a foot 102 of the user.

At 714, the user utilizes the user interface screen 600 to enter an input to either change or not change the subject part of the virtual foot 602.

At 716, the processor 202 determines if the user has completed updating the subject part, e.g., because the user has indicated that the subject part(s) are substantially the same as the foot 102. If the user has completed updating the subject part then the processor 202 proceeds to operation 718. If not, the processor 202 proceeds to operation 710 to iteratively update the subject part of the virtual foot 602.

At 718, the processor 202 determines if the user has updated all of the parts of the virtual foot 602 subject to being updated. If not, the processor 202 proceeds to operation 720. If so, the processor proceeds to operation 722.

At 720, the processor 202 changes the subject part of the virtual foot 602. For instance, if the subject part of the virtual foot 602 are the toes, as illustrated in FIG. 6C, and the user indicates that the toes do not need to change further, then the processor 202 may change the subject part to the width of the foot. The processor 202 then proceeds to operation 710 to present and iteratively update the new subject part.

At 722, the processor 202 obtains models 218 of articles of footwear. The processor 202 may variously obtain all models 218 of relevant footwear types, e.g., running shoes in the illustrated examples, all models 218, or only a subset of models 218 of a type based on various assumptions. For instance, if the user has indicated that the user is a women's size 6.5 and is looking for running shoes, then the processor 202 may only obtain models 218 for running shoes in women's sizes 5.5 through 7.5 while omitting other types and sizes.

At 724, the processor 202 compares the virtual foot 602 against models 218 of articles of footwear as obtained according to the principles disclosed herein, e.g., with respect to heat zones 404 or lack thereof by overlaying the models 218 of articles of footwear on the virtual foot 602. The processor 202 may identify various models of articles of footwear which meet various requirements for heat zones 404 or lack thereof to indicate a suitable fit. In an example, the processor 202 may identify a single best-fit model 218 or may identify multiple models 218 which fit.

A model 218 may fit based on the number and significance of heat zones 404. In an example, a model 218 may fit the virtual foot 602 if the model 218 has only two heat zones 404, neither greater than a predetermined maximum amount of interference. The predetermined maximum, and the number of heat zones 404, may vary among footwear types. Thus, in an example, a running shoe may allow for more heat zones 404 but with relatively less amount of interference in each heat zone 404 than a walking shoe. The details of the suitable fit for a model 218 may be highly situation dependent and thus may be separately determined for various models 218.

At 726, the processor 202 may cross-reference one or more of the models 218 selected as being fits for the virtual foot 602 against feedback obtained at operation 708. Thus, in an example, if the user has indicated that the user subjectively feels jarring impacts with a brand X, model A shoe with a heel strike running style, the processor 202 may note that a brand X, model B shoe may be preferred for heel striking over the model A shoe. In such an example, the processor 202 may subjectively rank the model B shoe for the user over the model A, even if the fit analysis at operation 724 suggests that the model A may be the best fit running shoe for the user.

At 728, the processor 202 causes the user interface screen 600 to display a recommended article of footwear, as illustrated in FIG. 6D. The recommendation may include multiple recommendations for articles of footwear, including explanations. For instance, in the above example, the processor 202 may display recommendations for both the model A and model B running shoes but may explain that the model B running shoe may be preferred owing to the feedback about the model A obtained at operation 708.

Figure 8:
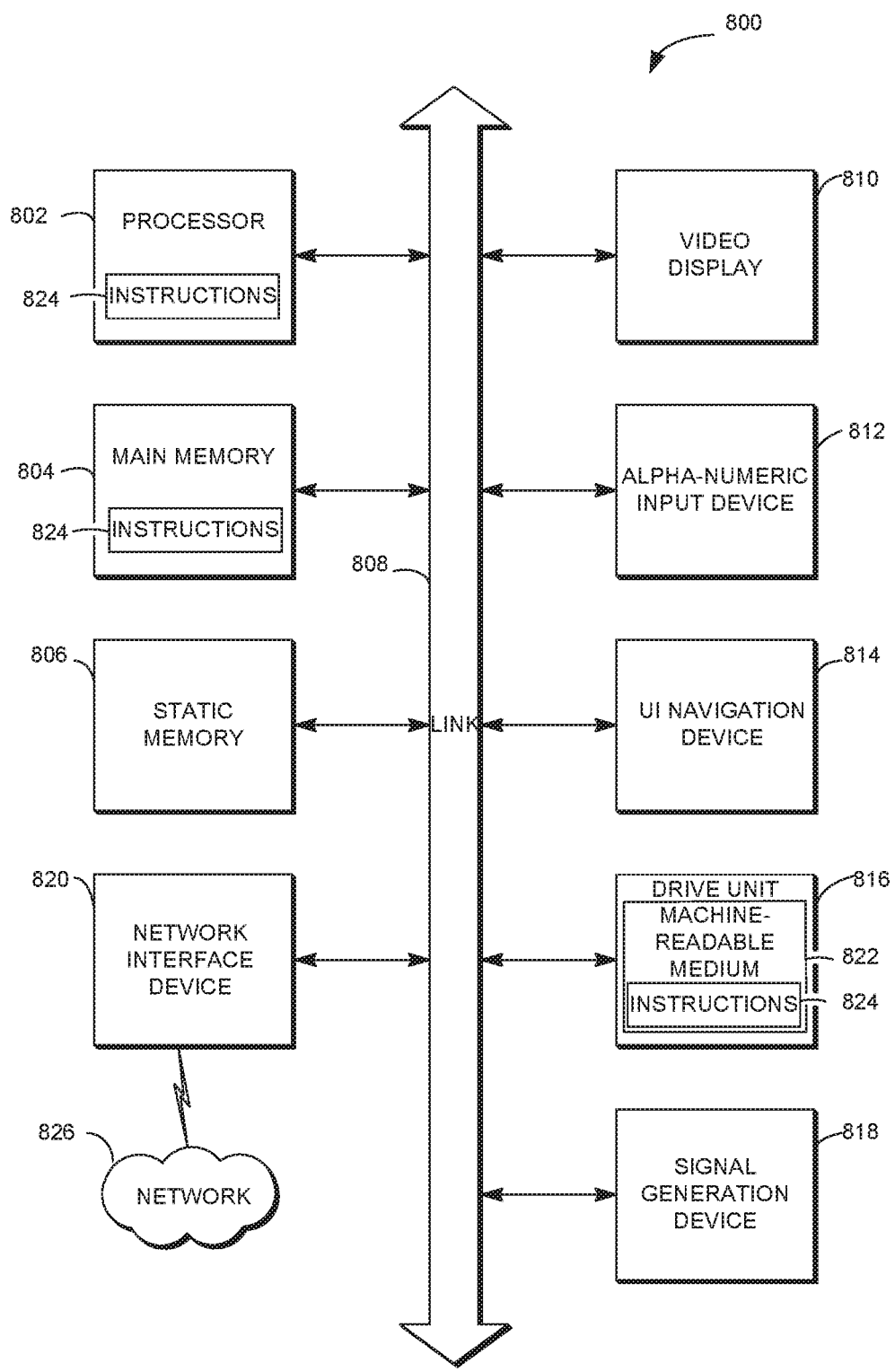
FIG. 8 is a block diagram illustrating components of a machine, according to some example embodiments, able to read instructions from a machine-readable medium.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 6 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
   a three-dimensional (3D) scanning element;
   an electronic data storage configured to store a database including 3D scan data;

a processor, coupled to the 3D scanning element and the electronic data storage, configured to:
  obtain first 3D scan data of a subject from a first time from the 3D scanning element;
  store the first 3D scan data in the database;
  cause a user interface to display an image based on the 3D scan data from the first time;
  obtain second 3D scan data of the subject from a second time, different than the first time, from the 3D scanning element;
  analyze the second 3D scan data from the second time for an incomplete region;
  generate a composite 3D image region using the second 3D scan data from the second time and from the database, wherein the composite 3D image region corresponds to the incomplete region;
  overlay the composite 3D image regions corresponding to the incomplete region on the second 3D scan data to produce a composite 3D image; and
  cause a user interface to display the composite 3D image.

2. The system of claim 1, wherein the processor is further configured to cause the processor to:
  analyze the first 3D scan data from the first time for the incomplete region; and
  generate a first composite 3D image based on the first 3D scan data from the first time and an estimation of the incomplete region;
  wherein the processor displays an image based on the first composite 3D image.

3. The system of claim 2, wherein the electronic data storage further includes fields for demographic information, and wherein the processor is configured to generate the estimation of the incomplete region based, at least in part, on the demographic information.

4. The system of claim 3, wherein the demographic information utilized to estimate the incomplete region is selected based on a demographic similarity with the subject.

5. The system of claim 1, wherein the display of the image based on the first 3D scan data from the first time and the display of the composite 3D image produce an animation.

6. The system of claim 1, wherein the display of the image based on the first 3D scan data from the first time and the display of the composite 3D image show a physiologic change in a subject of the 3D scan.

7. A non-transitory computer readable medium comprising instructions which, when performed by a processor, cause the processor to perform operations comprising:
  obtain, via a three-dimensional (3D) scanning element, first 3D scan data, of a subject from a first time;
  store the first 3D scan data in a database;
  cause a user interface to display an image based on the 3D scan data from the first time;
  obtain second 3D scan data of the subject from a second time, different than the first time, from the 3D scanning element;
  analyze the second 3D scan data from the second time for an incomplete region;
  generate a composite 3D image region using the second 3D scan data from the second time and from the database, wherein the composite 3D image region corresponds to the incomplete region;
  overlay the composite 3D image regions corresponding to the incomplete region on the second 3D scan data to produce a composite 3D image; and
  cause a user interface to display the composite 3D image.

8. The non-transitory computer readable medium of claim 7, wherein the instructions further cause the processor to:
  analyze the first 3D scan data from the first time for the incomplete region; and
  generate a first composite 3D image based on the first 3D scan data from the first time and an estimation of the incomplete region;
  wherein the processor displays an image based on the first composite 3D image.

9. The non-transitory computer readable medium of claim 8, wherein the database further includes fields for demographic information, and wherein the instructions further cause the processor to generate the estimation of the incomplete region based, at least in part, on the demographic information.

10. The non-transitory computer readable medium of claim 9, wherein the demographic information utilized to estimate the incomplete region is selected based on a demographic similarity with the subject.

11. The non-transitory computer readable medium of claim 7, wherein the display of the image based on the first 3D scan data from the first time and the display of the composite 3D image produce an animation.

12. The non-transitory computer readable medium of claim 7, wherein the display of the image based on the first 3D scan data from the first time and the display of the composite 3D image show a physiologic change in a subject of the 3D scan.

13. A method, comprising:
  obtaining, with a processor, via a three-dimensional (3D) scanning element, first 3D scan data, of a subject from a first time;
  storing the first 3D scan data in a database,
  causing, with the processor, a user interface to display an image based on the 3D scan data from the first time;
  obtaining, with the processor, second 3D scan data of the subject from a second time, different than the first time, from the 3D scanning element;
  analyzing the second 3D scan data from the second time for an incomplete region;
  generating, with the processor, a composite 3D image region using the second 3D scan data from the second time and from the database, wherein the composite 3D image region corresponds to the incomplete region;
  overlaying, with the processor, the composite 3D image regions corresponding to the incomplete region on the second 3D scan data to produce a composite 3D image; and
  causing, with the processor, a user interface to display the composite 3D image.

14. The method of claim 13, further comprising:
  analyzing, with the processor, the first 3D scan data from the first time for the incomplete region; and
  generating, with the processor, a first composite 3D image based on the first 3D scan data from the first time and an estimation of the incomplete region;
  displaying the image is based on the first composite 3D image.

15. The method of claim 14, wherein the database further includes fields for demographic information, and generating the estimation of the incomplete region is based, at least in part, on the demographic information.

16. The method of claim 15, further comprising selecting, with the processor, the demographic information utilized to estimate the incomplete region based on a demographic similarity with the subject.

17. The method of claim 13, wherein displaying the image based on the first 3D scan data from the first time and the display of the composite 3D image produces an animation.

18. The method of claim 13, wherein displaying the image based on the first 3D scan data from the first time and the display of the composite 3D image shows a physiologic change in a subject of the 3D scan.

* * * * *